Sept. 25, 1945.                C. W. CARNAHAN                 2,385,687
              LIGHT POLARIZING SCREENS AND METHOD OF MANUFACTURE
                         Original Filed July 7, 1938
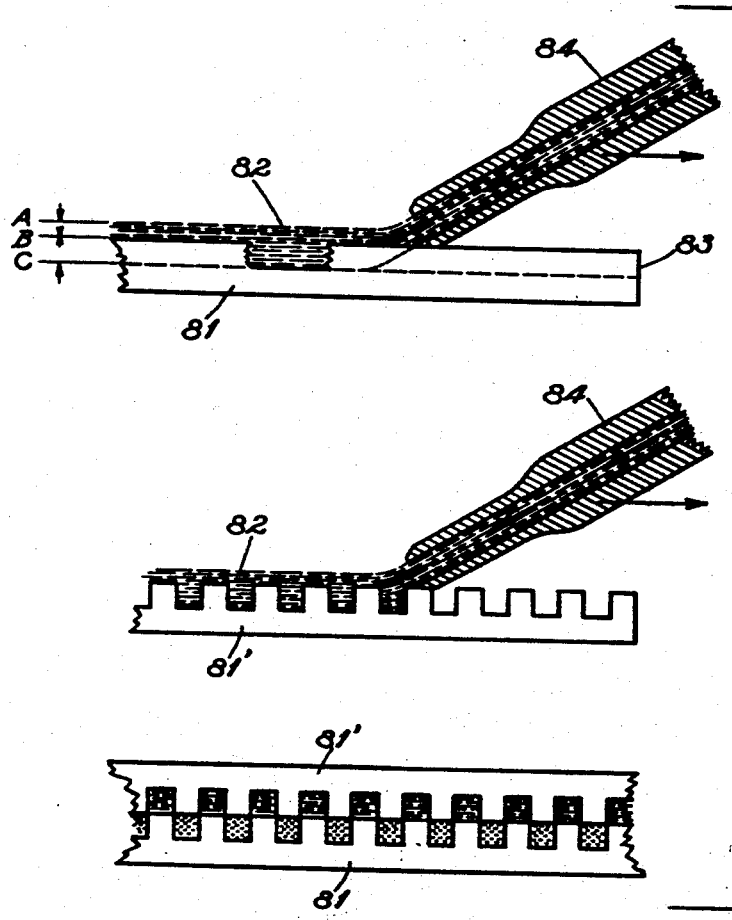
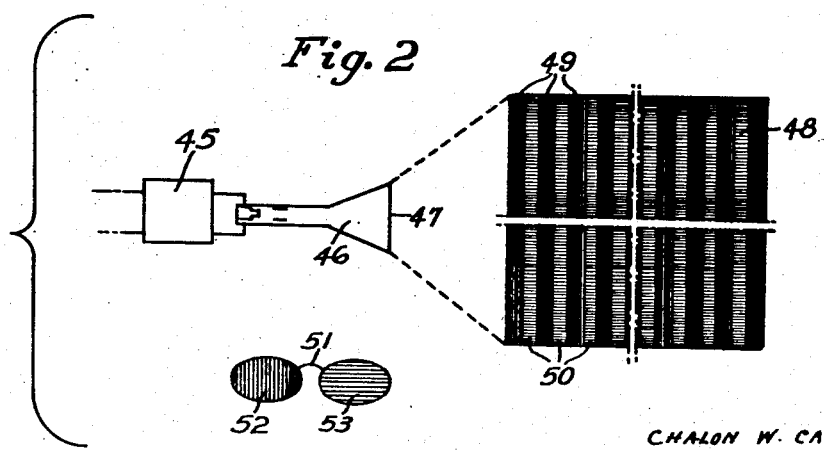
CHALON W. CARNAHAN
INVENTOR
BY John J. Rogan
ATTORNEY Patented Sept. 25, 1945

2,385,687

UNITED STATES PATENT OFFICE 2,385,687

LIGHT POLARIZING SCREEN AND METHOD OF MANUFACTURE

Chalon W. Carnahan, Oak Park, Ill., assignor to Sylvania Electric Products Inc., a corporation of Massachusetts Original application July 7, 1938, Serial No. 217,866. Divided and this application August 15, 1942, Serial No. 454,927

6 Claims. (Cl. 88—65)

This invention relates to light polarizing screens and methods of manufacture.

A principal object of the invention is to provide an improved light polarizing screen wherein certain sections polarize the light in one plane and other sections polarize the light in a transverse plane.

A feature of the invention relates to a light polarizing device made up of a plurality of strips of dichroic polarizing material, alternate strips acting on the light passing therethrough to polarize it at right angles to the polarization of the light passing through the intervening strips.

A still further feature relates to the novel organization, relative location and arrangement of parts constituting an improved light polarizing device.

Other features and advantages not specifically enumerated will be apparent after a consideration of the following detailed descriptions and the appended claims.

Fig. 1 illustrates the method of making the dichroic screen constituted of strips for polarizing the transmitted light alternately in planes parallel to, and at right angles to, the directions of the strips.

Fig. 2 is a schematic illustration of one manner of using the screen according to the invention.

There is shown in Fig. 2 in schematic form, a screen prepared according to the invention and one manner of illuminating it to explain its utility. In this figure, the screen 48 is illuminated by any source of light, such for example as the light produced on the fluorescent screen 47 of a cathode-ray tube 46, by means of which picture currents received in the device 45 may be converted to a luminescent scanning spot of light on screen 47 in a manner well-known in the television art. Ordinarily, the image on the screen 47 would be viewed by an observer directly. In accordance with the present invention, the light image reproduced on screen 47 is projected or passed through another screen 48 made up of a plurality of successive linear strips 49, 50, of any well-known dichroic light polarizing material, such as for example as "Polaroid." It will be understood of course that there will be the same number of strips 49, 50, as the number of linear elements scanned by the beam of tube 46.

The strips 49 and 50 are arranged so that alternate strips polarize the light passing therethrough at right angles, for example the strips 49 may be arranged to polarize horizontally the light passing therethrough, while the strips 50 polarize vertically the light passing therethrough.

The observer views the screen 48 through a pair of dichroic light polarizing filters which may for example be mounted in a spectacle frame 51. The filter 52 mounted in the left portion of the spectacle frame is arranged to pass light polarized in a horizontal plane, that is, the light passed by strips 49; while the filter 53 in the right-hand part of the spectacle frame passes light polarized in the vertical frame, that is, the light passed by strips 50. When the screen 48 is used for example as a television screen it will be understood of course, in accordance with well-known television principles, that the complete subject at the transmitter and at the receiver is scanned a certain minimum number of times per\second in accordance with the persistency of vision, for example, the subject may be scanned completely sixty times per second. Consequently, the observer viewing the screen 48 through the filters 52, 53, sees the image first through one eye and then through the other. Because of these displaced images, corresponding to the scannings by devices 1 and 2 at the transmitter which are stereoscopically or angularly placed with respect to the subject 3, the observer is given the impression of depth or relief in the image reproduced screen 48. It will be understood that the number of linear elements scanned and consequently the number of strips 49, 50, employed in the reproducing section are such that each alternate set of strips when illuminated give a satisfactory complete image of the subject.

The dichroic screen 48 according to the invention, of which alternate strips 49 and 50 are used for passing light polarized parallel and at right angles respectively to the direction of the strips may be made in a number of ways. A preferred way will now be described in connection with Fig. 1.

Generally, the proper orientation of the dichroic material to secure a high and uniform degree of plane polarization of the transmitted light is accomplished by using some asymmetrical property of the material to align the particles. If the asymmetry is one of physical dimensions, e. g. as in the crystals of "herapathite," which are needle shaped, the unoriented crystal mass mixed in a viscous cellulosic matrix may be extruded through a long narrow tube causing the needlelike crystals to be aligned in the direction of the flow lines of the matrix. If the asymetric property is a large molecular magnetic or electric moment, the mixture of dichroic material and matrix either during or after deposition on the supporting base, is subjected to suitably directed magnetic or electric fields, which interact with the individual molecular moments to align the crystals in the preferred direction with respect to the fields. Generally, dichroic materials show all of the above mentioned properties, and alignment by liquid flow is to be preferred because of its greater convenience.

One way of making the screen 48 would be to cut e. g. the strips 49 parallel to the direction of flow of one sheet of dichroic material deposited on flat surface by the flow method described above. The strips 50 may then be cut out of another sheet at right angles to the lines of flow. Finally alternate strips are cemented parallel to and touching each other on a suitable transparent carrier plate.

Considering the narrowness of the strips, which is of the order of .008" to .040", the cutting and cementing of a screen according to the described method may be inconvenient. According to the invention, therefore, one sheet 82 of the liquid dichroic material is deposited (see Fig. 6) on a suitable transparent matrix 81 provided with rectangular grooves of the desired width and distance between the grooves, from the nozzle 84. This sheet is deposited parallel to the direction of the grooves. A sheet 82 of periodically variable thickness viz. of the thicknesses AB and AC respectively is thus formed on the matrix 81. Before or after the dichroic material has dried, the layer thickness AB is removed leaving the grooves 83 filled with the polarized material, while the strips between the grooves are free from dichroic material. The second half of the dichroic linear screen is made by depositing in a similar way on a matrix 81" dichroic material from an appropriate nozzle, this time, however, at right angles to the direction of the grooves in the matrix. After removing the excess material as before on the first half, the two half-screens are cemented together in the manner indicated in Fig. 6.

This application is a division of application Serial No. 217,866, filed July 7, 1938, issued as Patent 2,301,254, November 10, 1942.

What I claim is:

1. The method of forming an interleaved strip dichroic light control device in which alternate strips polarize light in one plane and the intervening strips polarize light in a different plane, which method comprises flowing on to a grooved transparent support a quantity of dichroic material with the direction of flow substantially parallel to the grooves to fill the same while subjecting the material as it flows to a force causing orientation of the constituent particles of the material in a direction parallel to said grooves, flowing onto another grooved transparent support a quantity of dichroic material with the direction of flow substantially transverse to said grooves while subjecting the material in the grooves of said other support to a force to cause orientation of the constituent particles of said material in a direction transverse to the grooves in said other support, and attaching the said supports to each other with the grooves in one support staggered with relation to the grooves in the other support.

2. The method according to claim 1 in which the grooves in both supports are of substantially the same width, and the supports are attached so that the grooves in one support are opposite the ridges in the other support.

3. The method according to claim 1 in which the dichroic material is in the form of a viscous matrix and is extruded through a long narrow tube into the grooves on said supports.

4. A light polarizing filter comprised of two light transparent backings each having spaced grooves, said backings being attached to each other with the grooved surfaces abutting and with the grooves in one backing interposed between the grooves in the other backing, the grooves in one backing having a filling of light polarizing material having its constituent elements oriented in a particular direction for passing only light polarized in one plane, the grooves in the other backing having a filling of light polarizing material having its constituent elements oriented in a different direction from the first-mentioned direction for passing only light polarized in a plane different from the first mentioned plane.

5. A light polarizing filter according to claim 4 in which said backings are cemented to each other to form a unitary device.

6. A light polarizing filter according to claim 4, in which the grooves in both backings are in parrel lines and are all of substantially the same width.

CHALON W. CARNAHAN.